July 15, 1958 P. G. MARIÉ 2,843,800
MAGNETRON TUBE

Filed Jan. 6, 1953 16 Sheets-Sheet 1

INVENTOR
Pierre G. Marié
BY
ATTORNEYS

July 15, 1958  P. G. MARIÉ  2,843,800
MAGNETRON TUBE

Filed Jan. 6, 1953  16 Sheets-Sheet 2

INVENTOR
Pierre G. Marié
BY
ATTORNEYS

July 15, 1958  P. G. MARIÉ  2,843,800
MAGNETRON TUBE

Filed Jan. 6, 1953  16 Sheets-Sheet 3

INVENTOR
Pierre G. Marié
BY
ATTORNEYS

July 15, 1958

P. G. MARIÉ

2,843,800

MAGNETRON TUBE

Filed Jan. 6, 1953

INVENTOR
*Pierre G. Marié*
BY
ATTORNEYS

July 15, 1958  P. G. MARIÉ  2,843,800
MAGNETRON TUBE

Filed Jan. 6, 1953  16 Sheets-Sheet 7

INVENTOR
Pierre G. Marié
BY
ATTORNEYS

July 15, 1958  P. G. MARIÉ  2,843,800
MAGNETRON TUBE

Filed Jan. 6, 1953  16 Sheets-Sheet 8

INVENTOR
Pierre G. Marié
BY
ATTORNEYS

INVENTOR
Pierre G. Marié
ATTORNEYS

July 15, 1958
P. G. MARIÉ
2,843,800
MAGNETRON TUBE
Filed Jan. 6, 1953
16 Sheets-Sheet 12
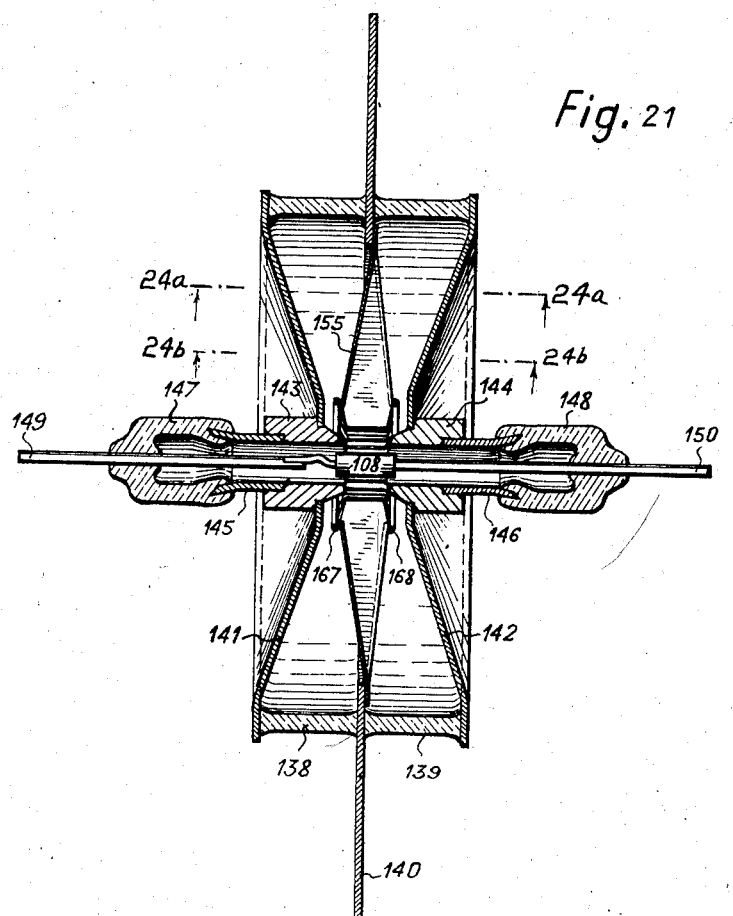
Fig. 21
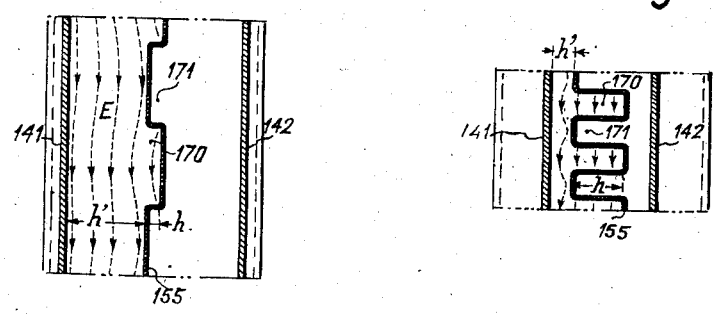
Fig. 24b
Fig. 24a
INVENTOR
Pierre G. Marié
BY
ATTORNEYS July 15, 1958 P. G. MARIÉ 2,843,800
MAGNETRON TUBE
Filed Jan. 6, 1953 16 Sheets-Sheet 14

INVENTOR
Pierre G. Marié
BY
ATTORNEYS

July 15, 1958  P. G. MARIÉ  2,843,800
MAGNETRON TUBE

Filed Jan. 6, 1953  16 Sheets-Sheet 15

INVENTOR
Pierre G. Marié
BY
ATTORNEYS

July 15, 1958 P. G. MARIÉ 2,843,800
MAGNETRON TUBE

Filed Jan. 6, 1953 16 Sheets-Sheet 16

INVENTOR
Pierre G. Marié
BY
Pennie, Edmonds, Morton, Barrows and Taylor
ATTORNEYS

United States Patent Office 2,843,800
Patented July 15, 1958

2,843,800

MAGNETRON TUBE

Pierre G. Marié, Paris, France

Application January 6, 1953, Serial No. 329,885

Claims priority, application France January 16, 1952

11 Claims. (Cl. 315—39)

The present invention relates to magnetrons and more particularly to magnetrons adapted for use as amplifiers of ultra-high frequency energy such as that having a wave length in the millimeter range.

In the tubes of the invention the energy is fed in through a circular wave guide as a wave propagated through the guide in the $TE_{01}$ mode, and the output energy is extracted from the tube in the same fashion. $TE_{01}$ circular mode filters may be provided at the ends of the tube. The input and output circular guides are collinear, and the cathode of the magnetron lies on the axis of the tube and in the common axis of the guide sections. Within the tube the incoming wave is separated into a plurality of waves propagated in the $TE_{01}$ rectangular mode through guides of substantially rectangular cross section to the vicinity of the cathode where an equal plurality of rectangular guides interlaced with the first leads to the output end of the tube. There is associated with the inner end of each pair of rectangular guides metallic elements which may take the form of segments, presenting three points or regions of voltage anti-node which are caused by the incoming energy to oscillate but at progressive phase differences of 120°. These oscillations give rise to a progressive wave rotating about the cathode, and amplification takes place by reflection of the components of this progressive wave at the negative resistance offered by the electron beam. The elements which make up these rectangular guides and the associated elements for generating the progressive wave may be referred to as the anode of the tube, although it is not necessary that all thereof be at anode potential.

In one embodiment, the anode is made up of two parts which may be referred to as the "external block" and the "internal block." On the input side the external block transforms the elements of input energy separated out by the input filter into waves approximating those of the $TE_{01}$ mode for rectangular guides and directs these waves through a plurality of conduits to the internal block. On the output side the external anode block guides the amplified energy radiated by the internal block through a plurality of conduits towards the output filter which re-establishes this enerergy in the $TE_{01}$ mode for circular guides.

The internal block comprises a plurality of segments whose sections in planes perpendicular to the axis of the magnetron have, about the tube axis, successively the shapes of U's and of Δ's. These segments convert the waves passing through the input conduits of the external block into a progressive wave rotating about the cathode. They also guide the amplified energy toward the conduits of the external block on the output side of the tube.

According to the present invention the input energy is separated into a plurality of partial waves distributed in equiangular fashion around the cathode, and the progressive wave is derived from these partial waves. Moreover a plurality of output partial waves are picked up at points equiangularly distributed around the cathode, and the output wave is built up from these partial waves.

In one embodiment of the invention the external anode block is made up of a double plurality of conduits having each a substantially rectangular section and in which the waves are propagated according to the $TE_{01}$ mode for rectangular guides. Of these conduits those of one group are coupled at one end to the input guide and those of the other to the output guide. The conduits have each an axial portion constituting an axial extension of the input (or output) guide, and also a radial portion which discharges in the vicinity of the internal block and which is connected to the axial portion by a curved portion.

In a second embodiment the conduits formed in the external anode block, have only a radial portion. The input and output waves are separated into partial waves, in the course of their radial progress, within conduits defined between a corrugated membrane and two conical membranes, one on the input and one on the output side of the tube. In the corrugated membrane the depth of the corrugations increases from the radially outside portion of the partition toward the portion thereof adjacent the axis of the tube. The surfaces of the corrugated membrane and of the conical membranes provide a transition between a peripheral annular space, in which the waves are of the $TE_{01}$ mode for circular guides, and a series of conduits which are substantially rectangular in section in their portions adjacent the tube axis and in which conduits the waves are of the $TE_{01}$ mode for rectangular guides. These last-mentioned conduits are themselves defined by the corrugated membrane in its portion adjacent the tube axis. This arrangement makes it possible to restrict the tube proper, i. e. the portion subjected to a vacuum, to the combination of the cathode and the corrugated membrane.

In a third embodiment the corrugated membrane is of special form and operates both as external and as internal anode block.

The invention will be better understood from a consideration of the following detailed description which is to be taken in conjunction with the annexed drawings in which:

Fig. 21 is a sectional view of the unitary anode block of the tube of Fig. 19.

Fig. 24a is a diagram illustrating development of a section of the corrugated diaphragm of Fig. 23 taken on a cylindrical surface coaxial with the axis of the magnetron, the surface of section being indicated in Fig. 21 at 24a—24a.

Fig. 24b is a diagram similar to that of Fig. 24a but taken on a cylindrical section surface indicated at 24b—24b in Fig. 21.

Fig. 28 further shows the electric field within this anode.

Fig. 29 shows a symmetrical excitation of the tube.

Figure 1:
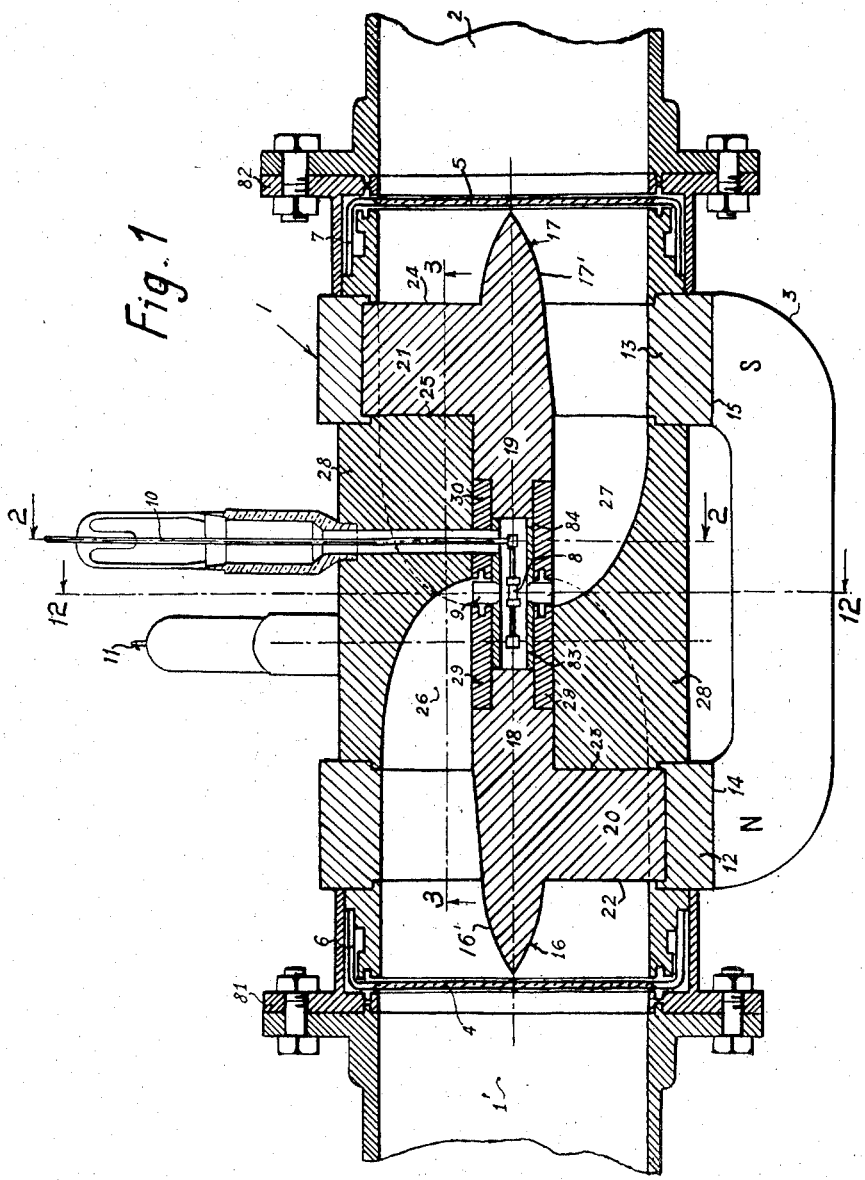
Fig. 1 is an axial section of a magnetron according to the invention, Fig. 1 constituting a section taken on the line 1—1 of Fig. 2.

In Fig. 1 an amplifying magnetron according to the invention is generally indicated at 1. 1' and 2 respectively indicate the input and output circular wave guides which feed energy to and abstract energy from the magnetron 1. The magnetron is provided with a strong direct magnetic field by means of a magnet 3. The magnetron is coupled to the guides 1' and 2 by means of coupling collars 81 and 82 and is made vacuum-tight by means of glass or ceramic diaphragms 4 and 5 which are sealed to the envelope of the tube by glass-to-metal sealing rings 6 and 7.

The cathode 8 is located on the axis of the tube, surrounded by the internal anode block 9. Leads 10 and 11 permit application to the cathode of heater current and of plate voltage. Axially opposite the poles of the magnet 3 there are provided two rings 12 and 13 of high permeability material. The rings 12 and 13 have plane faces indicated at 14 and 15 for contact with the poles of the magnet. These rings support two members generally indicated at 16 and 17 of high permeability material. Members 16 and 17 have respectively ogival axial portions 16' and 17' directed towards the input and output guides. The members 16 and 17 further include cylindrical portions 18 and 19 extending towards the cathode, and a plurality of radial fins 20 and 21. Two cylindrical sleeves 83 and 84 of high permeability material concentrate about the cathode the magnetic field led in by the axial portions 18 and 19.

Figure 3:
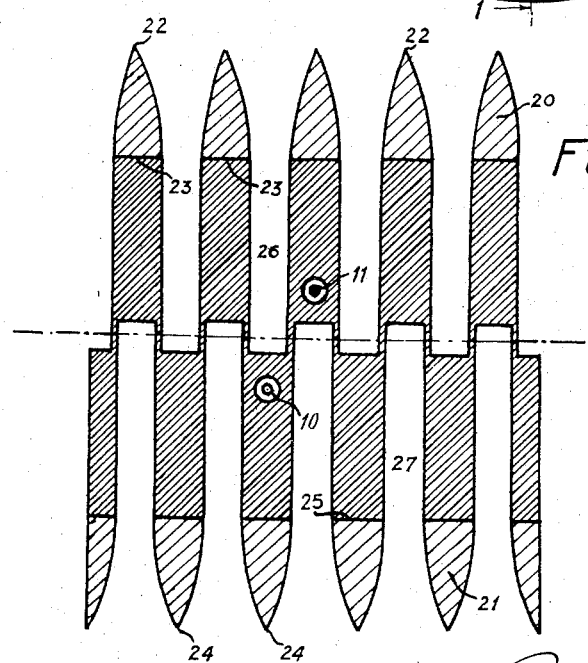
Fig. 3 is a developed view of a cylindrical section of the magnetron of Fig. 1, the section being centered on the tube axis, one of the generatrices being indicated at 3—3 in Fig. 1.

The fins 20 and 21 are shown in Fig. 3 in a developed view of a cylindrical section taken on a cylindrical surface coaxial with the axis of the tube and one of whose generatrices is shown at 3—3 in Fig. 1. The fins 20 have each a leading edge 22 of ogival shape and a rear face 23 perpendicular to the axis of the tube. Similarly, as indicated in Fig. 3, reference character 24 indicates the leading edge of the fins 21 and the reference character 25 indicates their rear faces. The fins define between them conduits having the shape in cross section of circular sectors whose height between their plane radial faces diminishes slightly from the radially exterior portion thereof toward the axis of the tube.

Figure 2:
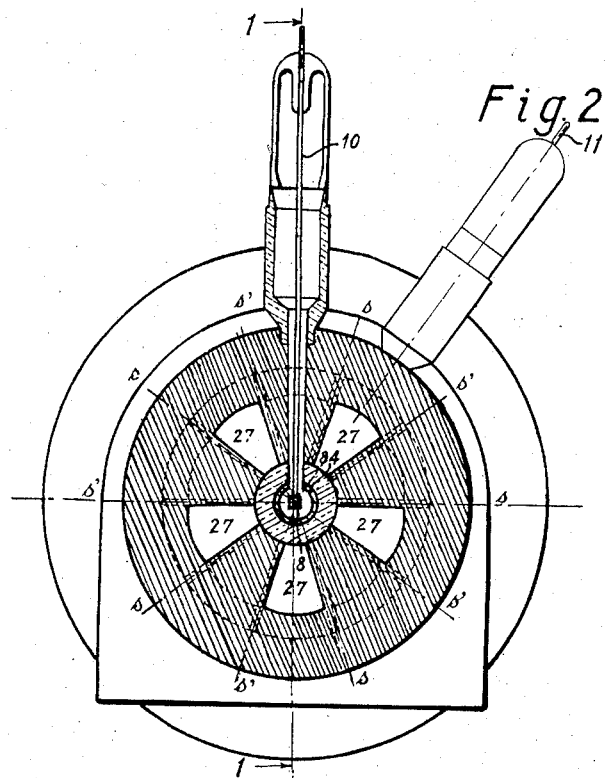
Fig. 2 is a sectional view of the magnetron shown in Fig. 1 taken on the line 2—2 of Fig. 1.

The shape of these conduits is similar to that of the conduits 27 shown in Fig. 2 with which the conduits defined by fins 21 are continuous. Their width (taken radially of the tube) also diminishes progressively as one moves from the leading edge to the base of the ogive. In the magnetron of Fig. 1 there are five fins in each group. The first group of fins 21 defining five input conduits and the latter group defining five output conduits. The radial, meridional planes of the leading edges 22 of fins 20 are displaced from the radial, meridional planes of the leading edges 24 of the adjacent fins 21 by an angle of approximately $2\pi/10$.

The openings defined by the fins 20 and 21 of members 16 and 17 are continued as conduits 26 and 27 of circular sector shape (Fig. 2) whose two radial (meridional) and whose larger circumferential faces are formed in the copper mass 28 of the magnetron. The smaller circumferential face is formed by the external wall of a copper sleeve 29, as to conduits 26, and by the external wall of a copper sleeve 30 as to conduits 27. The conduits 26 and 27 have in the portions thereof which are adjacent the fins a generally axial direction. They are however gradually curved perpendicularly to the tube axis and possess a substantially radial direction in the vicinity of the cathode.

Each set of fins constitutes a filter for selection of energy of the $TE_{01}$ mode in circular guides. The electric field of this wave is tangential in circular guides, and it assumes a direction perpendicular to the radial, meridional faces of the conduits 26 and 27. These conduits may be thought of as rectangular guides having in the axial portions thereof adjacent the fins 21 and 22 broad radial and narrow tangential faces and having in the radially extending portions thereof adjacent the cathode wide axial face and narrow tangential (transversely radial) faces. The tapered shape given to the fins is necessary in order to avoid sudden changes in the characteristic impedance of the guides under consideration.

The elements 28, 29 and 30 constitute the external anode block.

Figure 4:
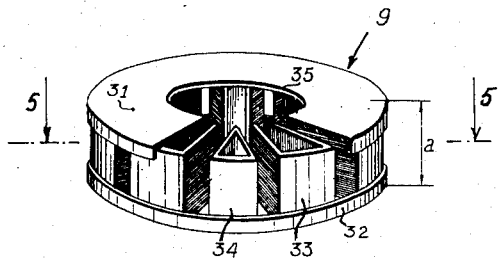
Fig 4 is a perspective view, partly broken away, of the internal block of the anode of the tube of Fig. 1.
Figure 5:
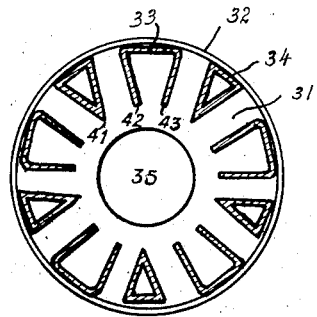
Fig. 5 is a sectional view taken on the line 5—5 of Fig. 4.
Figure 32:
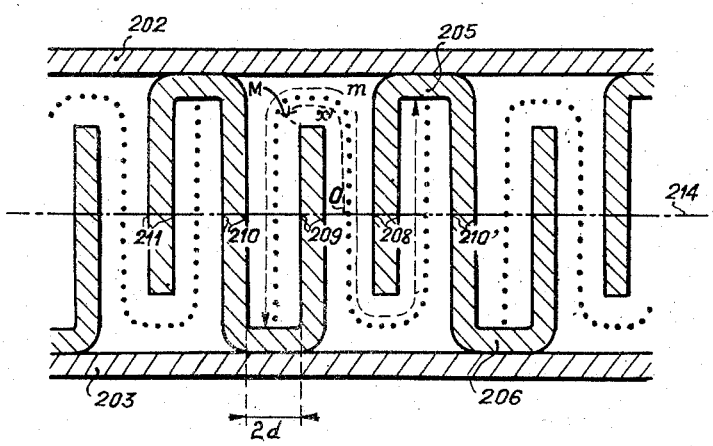
Fig. 32 is a section similar to that of Fig. 31 illustrating a further modified form of corrugated partition.
Figure 31:
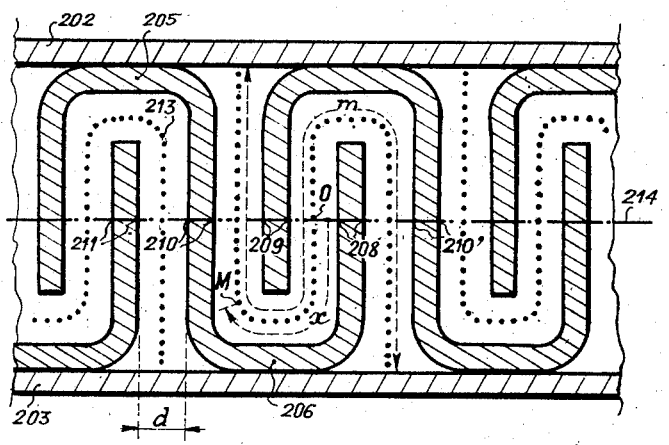
Fig. 31 is a sectional view similar to that of Fig. 29 but taken on a cylindrical section identified by the line 31—31 of Fig. 27.

The internal anode block generally indicated at 9 in Fig. 1 is further illustrated in Figs. 4 and 5. In Fig. 4, 31 and 32 designate two metallic end walls which may for example be made of molybdenum, to whose faces there are fastened by soldering or otherwise anode segments of sheet form so folded as to have in sections perpendicular to the axis of symmetry of the assembly either a U-shape (segment 33) or a Δ shape (segment 34). The U- and Δ-shaped segments alternate about the axis and have their narrow portions directed towards the axis. The openings 35 in the end members 31 and 32 are provided to permit passage of the cathode.

The amplifying magnetron of the invention operates by reflection of waves at the negative resistance presented by the electron beam which rotates about the cathode. The coefficient of reflection, which is substantially larger than unity, constitutes the coefficient of amplification.

The structure hitherto described is, apart the outlet leads 11 and 12 of the cathode, one which is axially symmetric and which is geometrically and electrically repetitive in form over angular intervals of $2\pi/5$ about its axis. It thus possesses five axes of symmetry in planes perpendicular to the plane of Fig. 1. These axes of symmetry are indicated in the plane of Fig. 2 and again in the plane of Figs. 12 and 13 by the straight lines $s$—$s'$.

Figure 6:
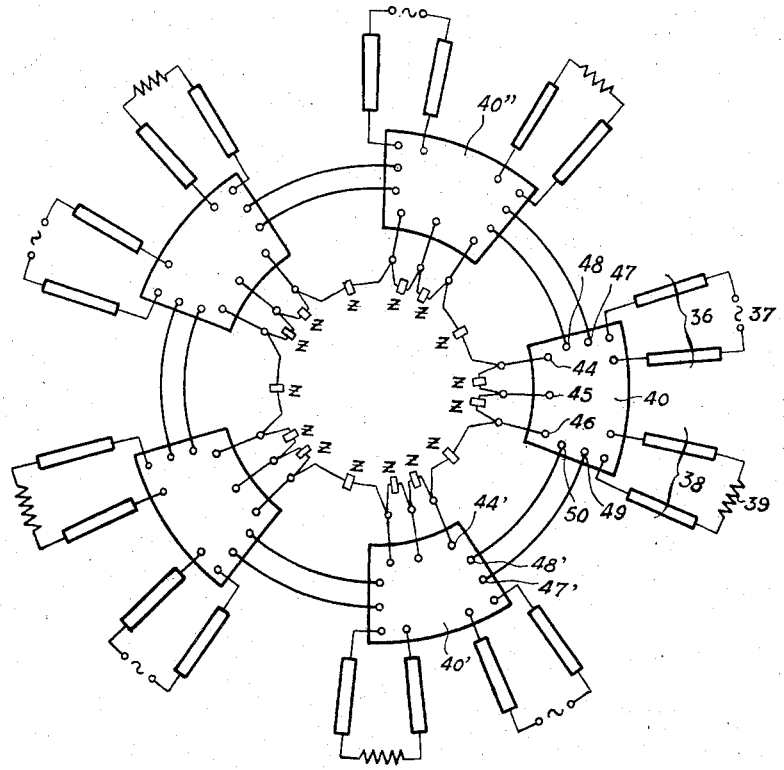
Figs. 6–11 are diagrams illustrating certain electrical equivalent circuits useful in explaining the operation of the magnetron of Fig. 1.

The electrically equivalent circuit of the tube shown in Fig. 6 reproduces these five elements of symmetry. In Fig. 6, there are shown five input lines 36 fed by in-phase generators 37, each of the lines with its generator corresponding to one of the conduits 26 through which energy is fed into the magnetron. In Fig. 6 there are further shown five output lines 38 terminated on their own characteristic impedances, each such line 38 and its load impedance 39 representing one of the conduits 27 through which energy is abstracted from the magnetron. Five multiterminal networks 40, 40', 40'' in Fig. 6 represent the energy exchange systems in the magnetron of Fig. 1 operating between the input and output waves and the electron beam. Each network exchanges energy with the beam at the three terminals 44, 45 and 46 which respectively symbolize the leading edge 41 of an anode segment of $\Delta$ shape and the leading edges 42 and 43 of an anode segment of U shape (cf. Fig. 5). In addition, each network 40 exchanges energy with the adjacent networks 40' and 40'', respectively at the terminals 47, 48 and 49, 50.

It will be subsequently shown that by appropriate measures the voltages obtaining between the terminals 44, 45 and 46 may be made equal in magnitude and 120° apart in phase. If this is the case, there will exist among the totality of terminals (leading edges) of the anode segments facing the cathode a plurality (five in the example shown) of three phase voltages giving rise to an electric field very similar to a progressive wave which circumscribes the cathode in a time interval five times as great as the period of the wave entering the conduits 26. Under these conditions the impedance reflected by the electron beam between any two of the anode segment terminals is constant, and is indicated as Z in Fig. 6.

Figure 7:
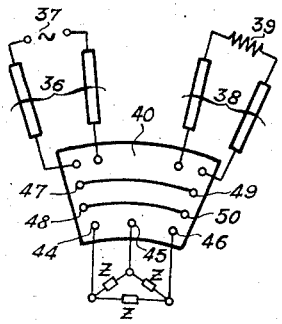

Inasmuch as the circuit of Fig. 6 presents a five-fold repetition of the same elements, both geometrically and electrically, the voltages and currents at the terminals 47', 48' and 44' are respectively the same as those at the terminals 47, 48 and 44. Consequently nothing is changed in the operation of the multiterminal network 40 by separating it from the others if the terminals 47 and 49 and the terminals 48 and 50 are short-circuited in pairs and if there is inserted an impedance Z between the terminals 44 and 46. The equivalent circuit so simplified is shown in Fig. 7, for one of the five elements of symmetry of Fig. 6.

The applicant has already disclosed the properties of such a multiterminal network in his article in l'Onde Electrique for February 1950, at pages 79–90. It is there shown that if the network of Fig. 7 is redrawn in the form of Fig. 8, in which A and B are the terminals of the input line 36 and A', B' are the terminals of the output line 38 and in which the impedances 51—56 have respectively the values $$\frac{jX}{4}, \frac{jX}{4}, jX, jX, \frac{-jX}{2}, -jX$$

and if moreover the terminals A', B' are connected through a resistance of the value $$\frac{X\sqrt{3}}{4}$$

and if there is applied between the terminals A and B an alternating voltage $V_{AB}$, then:

(1) The impedance seen between the terminals A and B is independent of Z and is equal to $$\frac{X\sqrt{3}}{4}$$

(2) The voltage between the terminals A', B' is $$V_{A'B'} = V_{AB}\frac{Z-X\sqrt{3}}{Z+X\sqrt{3}}$$

The latter expression is identical with that which describes the voltage reflected at the end of a line of characteristic impedance $X\sqrt{3}$ terminated by the impedance Z. It holds even if Z is a negative resistance and, when the reflection coefficient exceeds unity, $V_{A'B'}$ is greater than $V_{AB}$ and amplification occurs.

(3) The respective voltages between the terminals 44, 45 and 46 are balanced three-phase voltages having the values $$V, Ve^{j\frac{2\pi}{3}}, Ve^{-j\frac{2\pi}{3}}$$

in which $$V = [V_{AB} + V_{A'B'}]\sqrt{3}$$

and the currents between the terminals 44, 45 and 46 through the impedances Z have respectively the values $$I, Ie^{j\frac{2\pi}{3}}, Ie^{-j\frac{2\pi}{3}}$$

in which $$I = [I_{AB} - I_{A'B'}]\frac{1}{\sqrt{3}}$$

$I_{AB}$ and $I_{A'B'}$ being the currents in the input and output lines.

Figure 8:
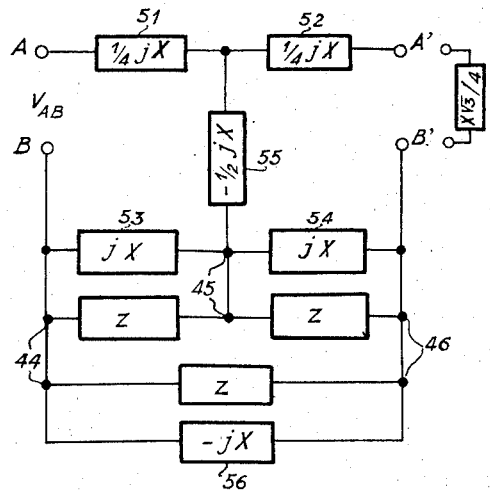
Figure 9:
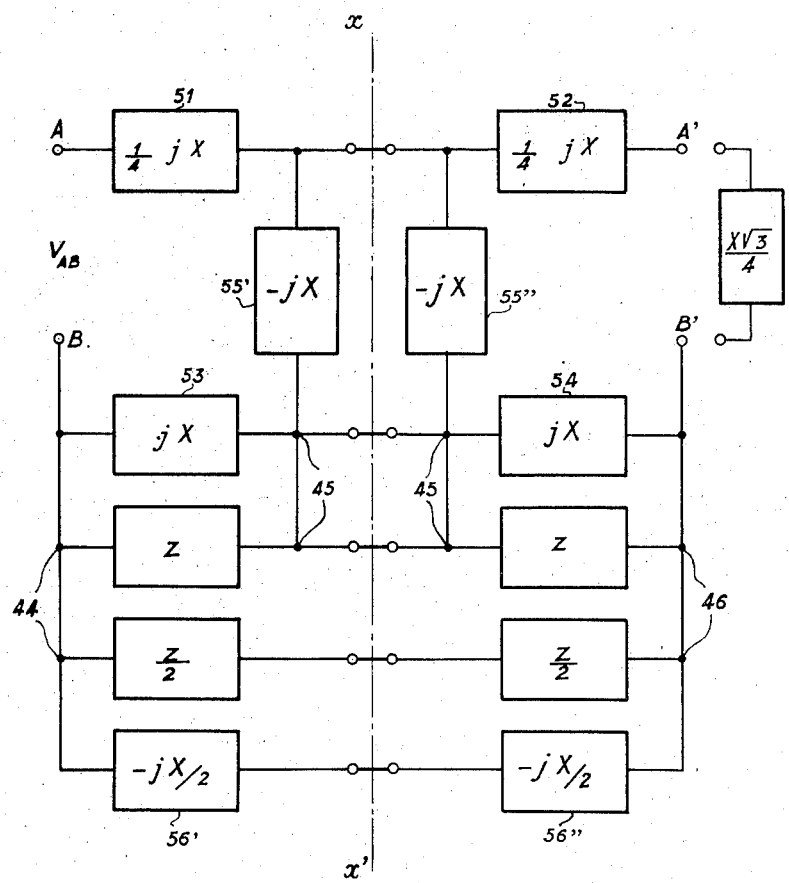

The demonstration of the foregoing propositions will not be understaken here. It may be achieved by replacing the network of Fig. 8 with that of Fig. 9, which is symmetrical. In the network of Fig. 9 the impedance 55 of Fig. 8 having the value $-\frac{1}{2}jX$ is replaced by two parallel impedances 55' and 55'' having both the value $-jX$. Moreover in Fig. 9 the impedance 56 of Fig. 8, of value $-jX$, is replaced by two series impedances 56' and 56'' of the value $$-\frac{jX}{2}$$

and the impedance Z between the terminals 44 and 46 of Fig. 8 is replaced by two series impedances Z/2 and Z/2. In order to determine the response of the network of Fig. 9 to an input voltage $V_{AB}$, one may proceed by superposing thereon two states of excitation, in the first of which the voltage $$\frac{V_{AB}+V_{A'B'}}{2}$$

is applied simultaneously to the input and output terminals, this being referred to as a symmetrical excitation. In the second state, there is applied to the input terminals a voltage $$\frac{V_{AB}-V_{A'B'}}{2}$$

and to the output terminals a voltage $$-\frac{V_{AB}-V_{A'B'}}{2}$$

constituting an antisymmetrical excitation.

Figure 10:
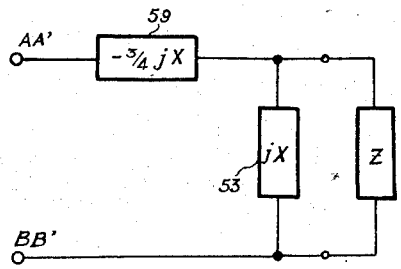

In the symmetrical state the currents flowing in the branches crossing the axis of symmetry $x$—$x'$ of Fig. 9 are zero, and the circuit is equivalent to that of Fig. 10. In Fig. 10 the impedances Z/2 and 56', 56'' are no longer connected, and 59 represents the impedances 51 and 55' in series.

Figure 11:
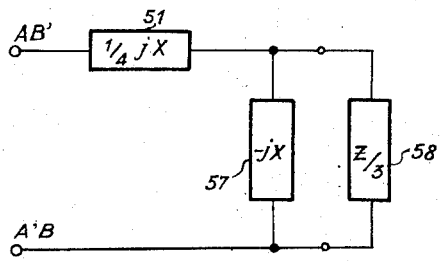

In the antisymmetrical state, the voltages on the axis of symmetry x—x' of the network of Fig. 9 are zero, and the network is equivalent to that of Fig. 11. In Fig. 11 the impedances 55' and 55'' are short-circuited. 57 represents the impedances 53 and 56' in parallel and 58 represents the impedances Z and Z/2 in parallel.

Figure 12:
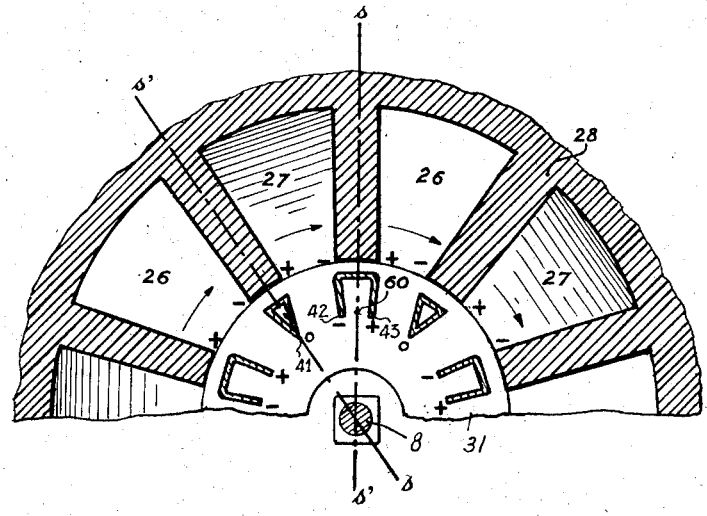
Fig. 12 is a partial sectional view of the external and internal anode blocks of the magnetron of Fig. 1 taken on the line 12—12 of Fig. 1, with certain indications concerning the electric fields obtaining under one phase condition.
Figure 13:
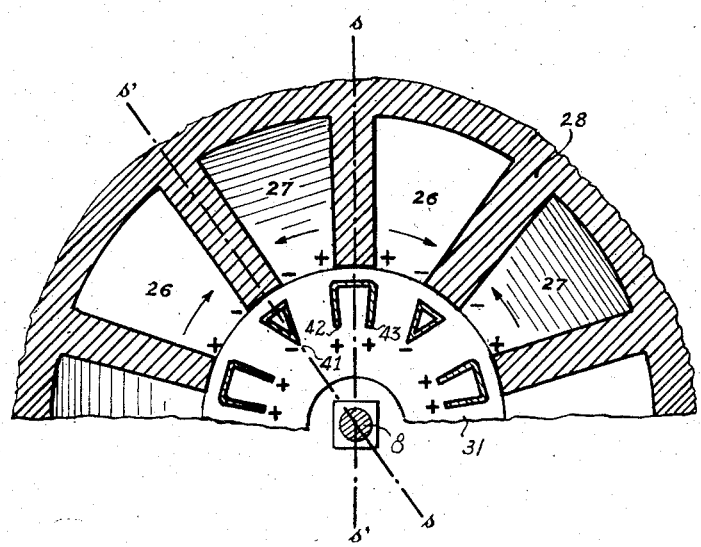
Fig. 13 is a figure similar to that of Fig. 12 but illustrating the electric fields at a different phase in the operation of the tube.

Figs. 12 and 13 represent fragmentary sections of the internal and the external anode blocks of the tube of Fig. 1 taken on the line 12—12 of Fig. 1.

In Figs. 12 and 13 the conduits 26 and 27 are shown characterized by field indicating arrows and by means of plus, zero or minus signs indicating respectively the direction of the electric field and the distribution of charges. If one considers two points respectively located within a conduit 26 and within a conduit 27 and which are derived from one another through a symmetry with respect to the plane perpendicular to Fig. 1 and which cuts said figure plane along the line 12—12 and a total rotation of an odd integral number of elementary rotations of approximately $2\pi/5$ (said two points being symmetrical of one another with respect to one of the axes s—s' of Figs. 12 and 13), the waves at said two points are cophasal in the case of Fig. 12 and the conduits 26 and 27 are said to vibrate symmetrically while the waves at said two points are in phase opposition in the case of Fig. 13 and the conduits 26 and 27 are then said to vibrate anti-symmetrically.

In the case of the symmetric vibration illustrated in Fig. 12, by reason of the symmetry with respect to the axes s—s' in the plane of the figure, the edges 41 of the Δ-shaped segments are without electrical charge and are at all times at the same potential as a point 60 on an axis s—s' midway between the edges 42 and 43 of a U-segment. For reasons of symmetry the radial electric field is zero along the symmetry axes s—s'.

Figure 14:
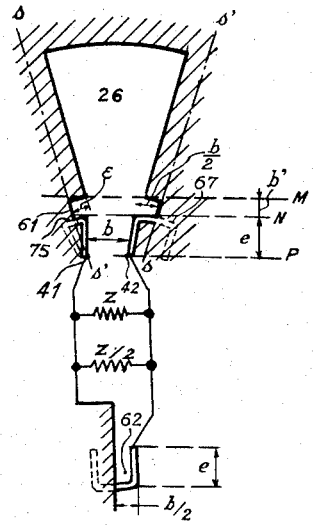
Fig. 14 is a partial sectional view similar to that of Fig. 12 combined with a diagram of certain equivalent electrical circuit elements useful in explaining the operation of the tube of Fig. 1.

Consequently if equal impedances Z are disposed between the edges of the U- and Δ-shaped segments, the exchange of energy between the waves entering the tube symmetrically and these Z-impedances takes place in accordance with the indications of the equivalent circuit shown in Fig. 14 in which the operation at a single conduit 26 is considered. In Fig. 14 short-circuit connections 61 are indicated in the planes of the axes s—s', and impedances Z and Z/2 are indicated between the edge 42 of the U-segment and the point 41 of the adjacent Δ-segment, the latter of which represents the impedance between the edge 42 of the U-segment and the mid-point of the U-segment indicated at 60. Lastly the reactance presented by the interior of the U-shaped segment between one edge thereof and its plane of symmerty is schematically indicated in Fig. 14 at 62.

In the case of the antisymmetric vibration illustrated in Fig. 13 the two edges 42 and 43 of the U-segment carry instantaneously the same charges, and no current passes from one to the other. It is only the impedances Z between one edge of the U-segment and the edge of the adjacent Δ which exchange energy with the conduits 26 and 27. In the symmerty planes s—s' the electric field is directed radially, and the magnietic field is zero. Moreover the impedance is there infinite and has been shown schematically in Fig. 15 by means of a short-circuited quarter wave guide section 63.

Figure 15:
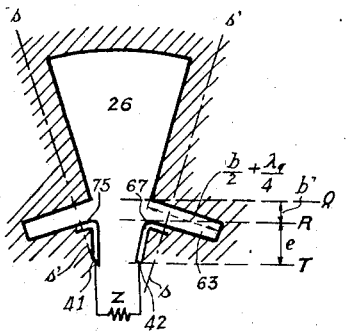
Fig. 15 is a further partial sectional view simiiar to that of Fig. 14 but showing a different electrically equivalent structure.

In order to obtain three-phase balanced voltages between the edges 41, 42 and 43 it is necessary that the circuits of Figs. 14 and 15 be appropriately dimensioned to render them respectively equivalent to the circuits of Figs. 11 and 10. For this dimensioning an initial approximation is obtained by neglecting the curvature of the magnetron and the thickness of the metal making up the U- and Δ-shaped segments.

Let $a$ be the height between the end plates 31 and 32 in Fig. 4. The equivalent circuits shown in section in Figs. 14 and 15 may be thought of as being constituted exclusively of stub sections of rectangular wave guides in which the waves are polarized parallel to the planes of those of Figs. 14 and 15. The width or broad side of each of these guides has a dimension $a$, and the length $\lambda_g$ of the waves within those guides is given by $$\lambda_g = \frac{\lambda}{\sqrt{1 - \frac{\lambda^2}{4a^2}}}$$

in which $\lambda$ is the wave length in free space. Moreover the characteristic impedance of a rectangular guide is proportional to its height or narrow transverse dimension.

Let $b$ be the distance between two successive leading edges of the internal anode block, i. e. the distance between the points 41 and 42 in Figs. 14 and 15.

The base 67 of the U-shaped segments similarly has a length (cf. Fig. 14) $b$. Let $b'$ be the distance between this base and the external anode block. The base 75 of the Δ-shaped segment may be reduced to a very short length $2e$ and it may indeed be substantially eliminated if the segment is formed from a thin sheet of metal radially disposed with respect to the cathode. There then occurs no disturbance in the diaphragm at the position of the short circuit 61 (Fig. 14). The resulting structure between planes M and N (Fig. 14) therefore appears as a simple T in plane E. In volume 10 of the Radiation Laboratory Series (Marcuvitz), it is shown at page 337 how the three impedances of the $\pi$-cell equivalent of such a T may be computed.

Figure 16:
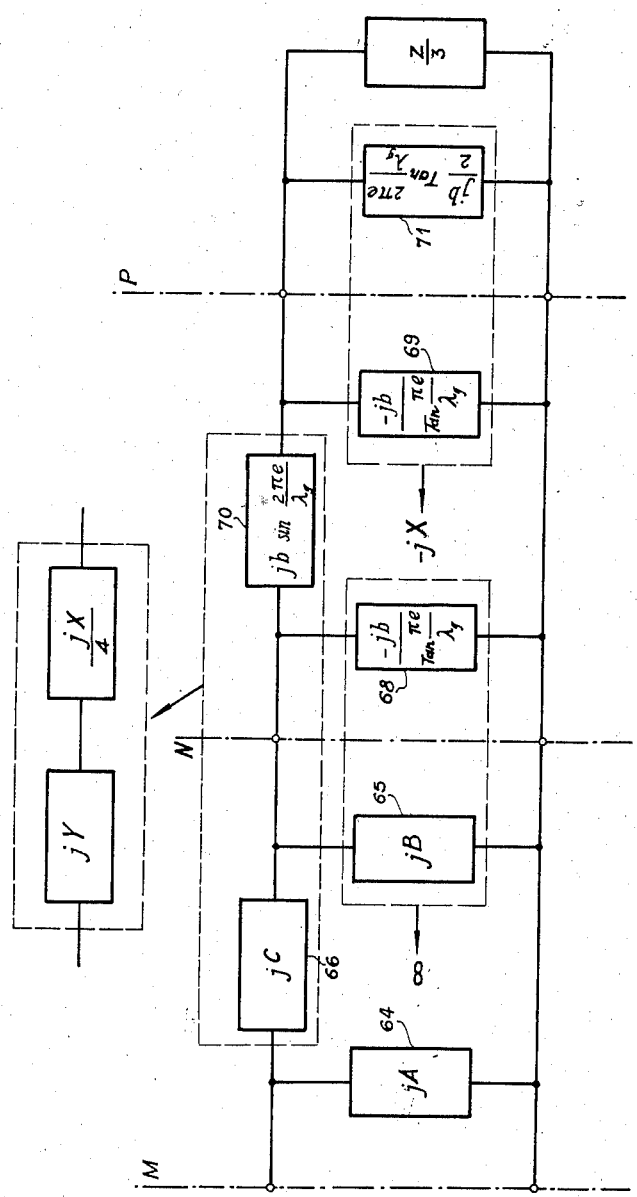
Fig. 16 is a diagram representing the electrical equivalent of the structure shown in Fig. 14.

The impedances 64, 65 and 66 of Fig. 16 represent the three impedances equivalent to the T contained between planes M and N of Fig. 14.

The impedances 68, 69 and 70 of Fig. 16 are equivalent to the wave guide stub of length $e$ contained between the planes N and P of Fig. 14, and the impedance 71 of Fig. 16 represents the reactance exhibited by the short-circuited wave guide stub 62 whose length is $e$ and whose short side or height is $b/2$. Lastly the impedance Z/3 of Fig. 16 results from the parallel relation of the impedances Z and Z/2 in Fig. 14.

Figure 17:
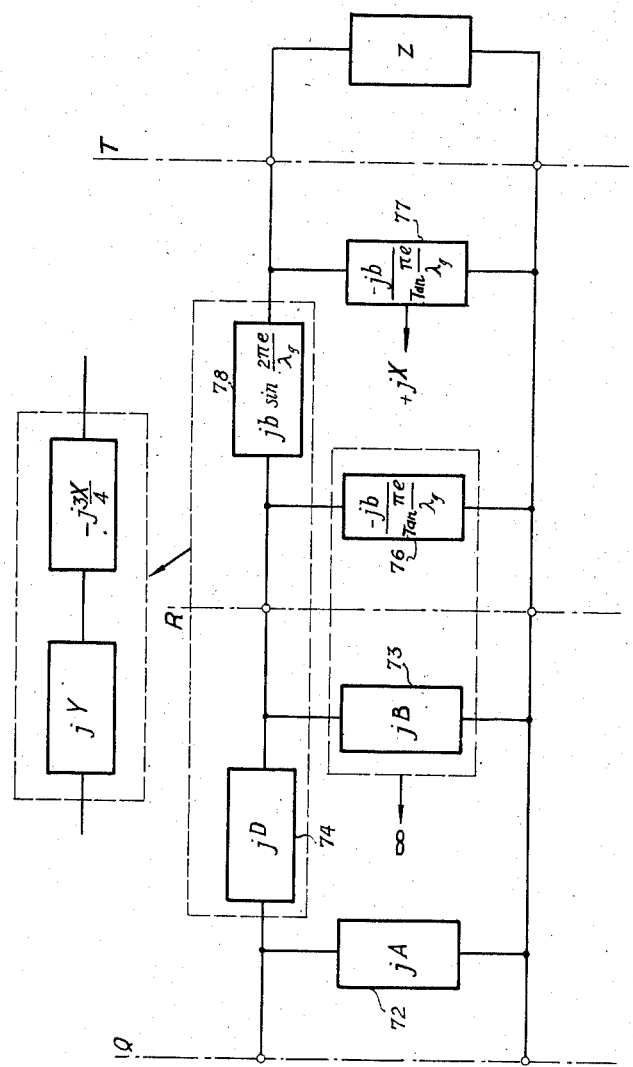
Fig. 17 is a diagram representing the electrical equivalent of the structure shown in Fig. 15.

Similarly the impedances 72, 73 and 74 of Fig. 17 represent the $\pi$ cell which is equivalent to the double T comprised between the planes Q and R of Fig. 15. The theory shows that the impedances 72 and 73 have the same value as impedances 64 and 65. It is only the impedance 74 which differs substantially from impedance 66. The impedances 76, 77 and 78 of Fig. 17 represent the $\pi$ cell which is equivalent to the wave guide stub of length $e$ comprised between planes R and T of Fig. 15.

In these equivalent circuits there have been neglected the reactances of the capacities which appear between the leading edges outside the guides. Marcuvitz shows at pages 179 and 183 of the reference previously cited how these capacities, which are to be considered as in parallel to the impedance Z, may be evaluated. The problem is to determine the respective values of $e$, $b$ and $b'$ required so that the equivalent circuits of Figs. 16 and 17 will correspond respectively to the circuits of Figs. 11 and 10.

It may be first observed that the combination of parallel reactances 73 and 76 (Fig. 17) or 65 and 68 (Fig. 16) must have an infinite reactance, with the result that $$B = \frac{b}{\tan \frac{\pi e}{\lambda_g}}$$

Consequently the parallel impedances 69 and 71 of Fig. 16 must have a total reactance of $-jX$ and the reactance of the element 77 in Fig. 17 must be $+jX$. If regard is had only to the values ascribed to these impedances, neglecting the capacities between leading edges of the U- and Δ-segments, the last two conditions derived require that $$e = \frac{\lambda_g}{6} \text{ or } e = \frac{5}{6}\lambda_g,$$

and that
$$X = b\sqrt{3}$$

The desired identification is achieved by solving the equations $$C + b \sin \frac{2\pi_e}{\lambda_g} = Y + \frac{X}{4}$$

$$D + b \sin \frac{2\pi_e}{\lambda_g} = Y - 3\frac{X}{4}$$

The circuits of Figs. 16 and 17 thus become equivalent to those of Figs. 11 and 10 preceded by an L-shaped cell whose series reactance is $jY$ and whose parallel reactance is $jA$. This L-shaped cell must on the one hand be matched to the impedance $$X\frac{\sqrt{3}}{4}$$

and on the other hand it must also be matched to the impedance of the conduits 26 and 27. It acts like a transformer and does not affect the operation of the complete assembly.

Of course the computations summarized hereinabove are appproximate and are given only to indicate how the dimensions of the magnetron may be determined. In practice the calculated values must be more or less modified in accordance with data measured on the tube.

Figure 18:
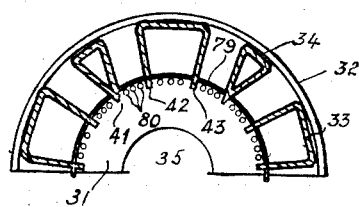
Fig. 18 is a partial sectional view similar to that of Fig. 13 showing a modified form of internal anode block.

Fig. 18 illustrates schematically a modified form of internal anode block including in addition to the U-shaped segments 33 and Δ-shaped segments 34 a resonant grid coupled to the leading edges of those segments. Two rings, of molybdenum wire for example, of which one ring 79 is shown in the figure, connect the leading edges of the segments. Between these two rings are disposed the wires 80 of the resonant grid, having a voltage antinode midway between the rings 79. The presence of the wires 80 slows down the rotation of the progressive wave around the cathode. If a single grid wire is provided between each two consecutive segment edges, the speed of rotation of the wave is divided by two. Actually if the two adjacent leading edges oscillate in the first and second phases of the three-phase voltage, the mid-point of the wire inserted between them will oscillate in phase opposition to the sum of the voltages of phases I and II, i. e. in phase III. Thus two phase differences II—III and III—I are substituted for a single phase difference I—II in the same space. With three wires between each two consecutive leading edges as indicated in Fig. 18, the speed of rotation is divided by four.

Figures 19, 20:
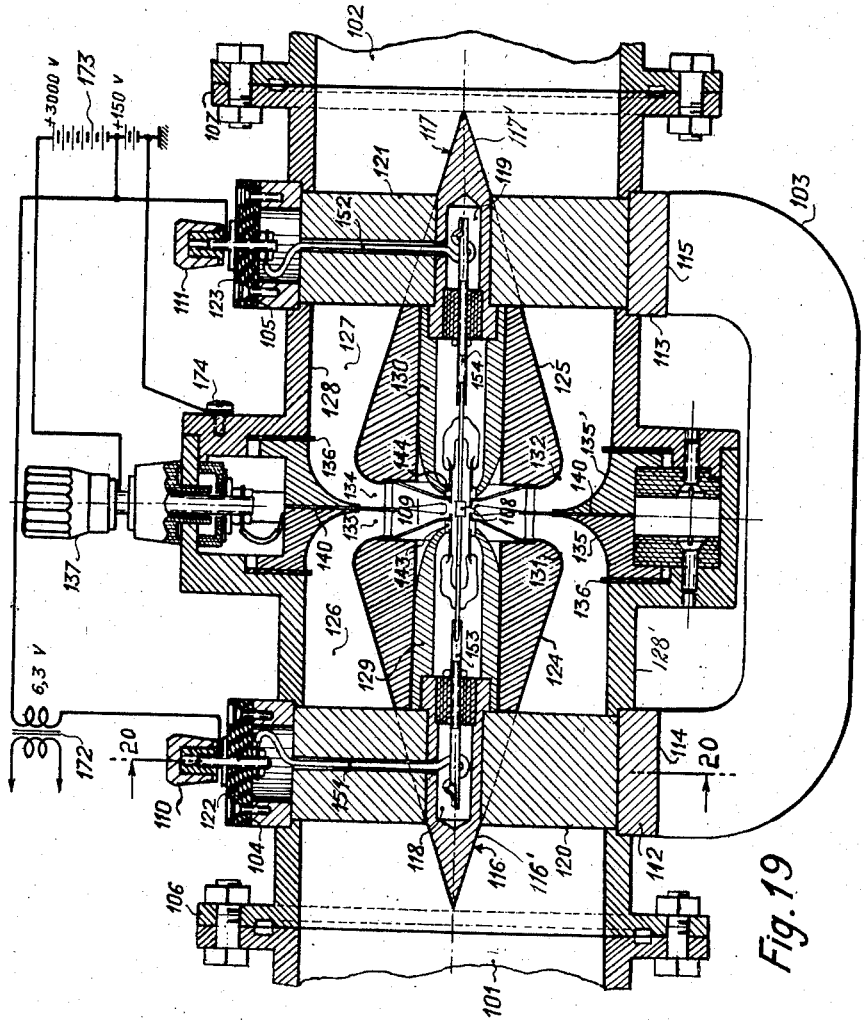
Fig. 19 is an axial section of a modified form of tube according to the invention, showing certain external circuits and auxiliary apparatus.
Fig. 20 is a sectional view taken on the line 20—20 of Fig. 19.

In the embodiment of the tube of the invention shown in Fig. 19, 101 and 102 indicate respectively the circular input and output wave guides, and 103 indicates a magnet. The magnetron comprises two envelope members 128 and 128' and is connected to the guides by collars 106 and 107.

At the center of the tube the cathode 108 is surrounded by the anode block generally indicated at 109.

Opposite the poles of the magnet 103 the tube is provided with rings 112 and 113 of high permeability material having plane faces 114 and 115 which are fitted to the poles of the magnet. The rings 112 and 113 are provided with additional plane faces 104 and 105 on which are mounted the terminals 110 and 111 for application of the cathode-heater current. Terminals 110 and 111 are insulated from the tube by sleeves 122 and 123.

Pluralities of radial fins 120 and 121 of high permeability material are affixed to the rings 112 and 113, respectively. The fins 120 support an axially extending high permeability member generally indicated at 116, and the fins 121 support a similar member generally indicated at 117. Members 116 and 117 possess ogival portions 116' and 117' respectively, directed towards the input and output guides 101 and 102. They also include cylindrical cavities 118 and 119, respectively. The ends of the members 116 and 117 adjacent the cathode fit within high permeability metallic sleeves 129 and 130 which conduct the magnetic field to two further metallic sleeves 143 and 144 of reduced diameter which surround the cathode and which fit nicely within the sleeves 129 and 130.

For ease of assembly the sleeves 129 and 130 are formed each of two portions fitting together along a meridional plane of the tube. These portions are held together within the sleeves 124 and 125 which are appropriately bored to receive them.

The external envelope elements 128 and 128' and sleeves 124 and 125 may be made of brass. Sleeves 124 and 125 have externally a surface similar to that of a truncated cone and are supported against the faces of the fins 120 and 121 nearest the cathode. There are thus defined between sleeves 124 and 125 and the envelope two annular spaces 126 and 127 of diminishing radial extension as the center of the tube is approached. The edges 131 and 132 at the base of the truncated cones 124 and 125 are rounded, and the internal surfaces of the envelope 128 opposite these rounded portions are formed with similarly rounded concave surfaces on ring-shaped members 135 and 135' to define two annular spaces of transition between the spaces 126 and 127 in which the direction of propagation is axial, and the annular spaces 133 and 134 in which the direction of propagation is radial, and which lead to the anode block 109.

There is inserted between the ring-shaped members 135 and 135' a diaphragm 140. The assembly of elements 135, 135' and 140 is insulated from the envelope 128 by suitable means such as mica spacers 136, and it is connected to the terminal 137 to which the anode voltage of the tube is applied.

The tube itself shown in Fig. 21 comprises a cylindrical glass envelope made up of two portions 138 and 139 sealed at their adjacent edges to the diaphragm 140. It also includes two conical metallic diaphragms 141 and 142 sealed to the glass cylinder, two hollow sleeves 143 and 144 of high permeability material, and two metallic rings 145 and 146 closed by glass beads 147 and 148. The enclosure just described is accordingly vacuum-tight and is evacuated, diaphragms 141 and 142 being welded or otherwise sealed to the sleeves 143 and 144. The cathode 108 is supported axially of the structure just described on leads 149 and 150.

Referring again to Fig. 19, the heater-current is brought in at terminals 110 and 111 and thence to the leads 149 and 150 (Fig. 21) by means of wires 151 and 152 (Fig. 19) which are passed respectively through bores provided in one of the fins 120 and in one of the fins 121. The wires 151 and 152 connect with leads 149 and 150 via the further leads 153 and 154.

Figure 23:
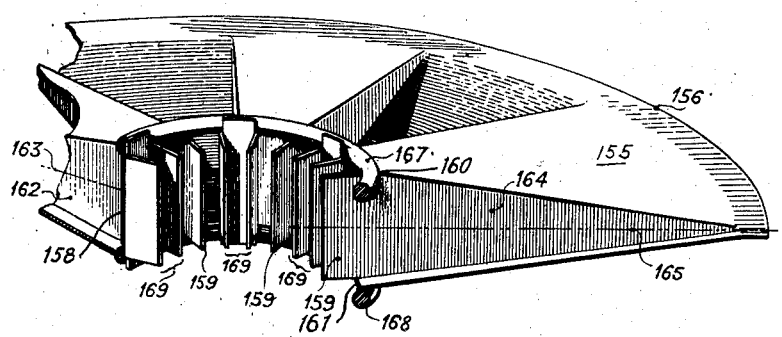
Fig. 23 is a perspective view of the corrugated diaphragm of the tube of Fig. 19 together with its U- and Δ-shaped segments.

A corrugated metallic diaphragm 155, shown in fragmentary perspective in Fig. 23, is provided with a plane outer edge 156 which is soldered to the diaphragm 140. The diaphragm presents corrugations of increasing depth towards the axis of the tube. The diaphragm 155 forms with the conical diaphragms 141 and 142 a double plurality of radial conduits of varying depth.

Figure 22:
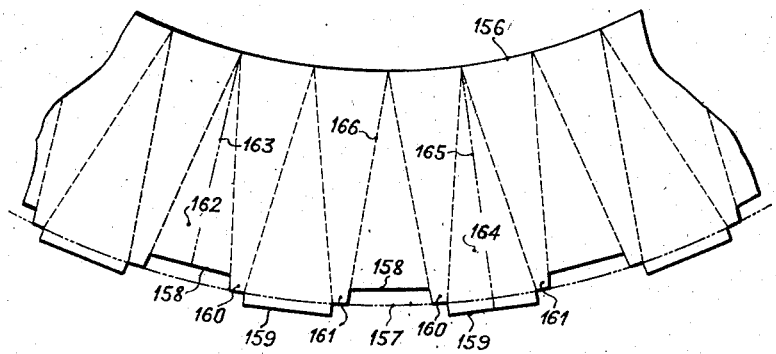
Fig. 22 is a developed view of the corrugated membrane of the tube of Fig. 19 prior to its folding into corrugated shape.

This corrugated diaphragm is shown in developed form in Fig. 22. When so spread out, it possesses the general shape of a circular ring interiorly limited by a circular edge 156 (maintained substantially plane but reversed in curvature when the diaphragm is folded into the form of Fig. 23) and exteriorly limited by a crenelated edge having tabs 159 extending beyond and cut-out edges 158 falling short of an average circular limit indicated at 157. The crenelated edge further includes equal alternate portions 160 and 161. In the formation of the diaphragm there are scribed on its surface triangles 162 having as base the edge portions 158 and alternate triangles 164 having as base the tabs 159. The altitudes of triangles 162 and 164 are respectively indicated at 163 and 165.

In the following explanation the axis of the tube will be considered to be vertical. The diaphragm is folded along the adjacent sides 166 of the triangles in such fashion that the edge 156 which is to be fastened to the diaphragm 140 remains horizontal, so that the altitudes 163 and 165 of the triangles remain in a single plane, further so that the edges 158 and tabs 159 fall into vertical planes. In this way the triangular surfaces 162 and 164 lie in vertical planes, while the trapezoidal areas between them fall into two groups, one conforming to the surface of a circular cone of vertical axis and large apex angle, the apex being above the plane containing the altitude lines 163 and 165, and the other conforming to the surface of a similar cone but having its apex below the plane containing the altitudes.

Fig. 23 shows the completed diaphragm in perspective. The tabs 159 form plane blades lying in meridian planes of the tube, and they constitute the Δ-shaped segments of the internal anode of this embodiment.

Two metallic rings 167 and 168 are affixed, one to the portions 160 and the second to the portions 161. These rings are made to lie in planes perpendicular to the axis of the tube. U-shaped segments 169 are soldered to these rings between successive blades 159.

Figs. 24a and 24b show the developments of sections of the conical diaphragms 141 and 142 and of the corrugated diaphragm 155, the sections being taken on cylinders coaxial of the tube as indicated at 24a—24a and 24b—24b in Fig. 21. It is evident that the diaphragm 155 defines with the conical diaphragm 141 a series of open radial conduits 170 exposed to the input waves and a similar series of conduits 171 in which circulate the amplified output waves. The depth $h$ of these open conduits increases in passing from the periphery towards the center at the same time as the height $h'$ of the communicating passages between adjacent conduits 170 diminishes in the same sense. There is always preserved however the relation $$\frac{\lambda}{2} < h + h' < \lambda$$

The $TE_{01}$ waves which are propagated in the input and output circular guides are not perturbated by the fins 120 and 121, and they pass through the annular spaces 126 and 127 axially with a tangential electric field, i. e. with a field perpendicular to the radial direction. They are further propagated radially in the annular spaces 133 and 134 with an electric field which remains tangential. At the entrance to the anode block the electric field $E$ of the input wave (Fig. 24a) thus has a direction which is perpendicular to the meridional planes containing the axis of the tube. Thus in progressing along the conduits 170 towards the cathode the input wave is transformed into a $TE_{01}$ wave for rectangular guides (Fig. 24b). Similarly the output wave which has the $TE_{01}$ form for rectangular guides in the portion of the conduits 171 adjacent to the cathode is transformed into a $TE_{01}$ wave for circular guides in the portion of these conduits adjacent the periphery of the corrugated partition 155.

Referring again to Fig. 19, the terminal 137 is connected to the positive pole of a battery 173, the envelope 128, 128' is connected to the negative terminal of the battery at 174, and the terminal 111 is connected to an intermediate tap on the battery 173. The heater-current is provided from a transformer 172.

It may be observed that the cathode is at a positive potential with respect to the envelope. This arrangement makes it possible to regulate the intensity of the electron current within the magnetron since the central sections of the sleeves 143 and 144 which guide the magnetic field in towards the active space of the tube and which are at the potential of the envelope function in a fashion analogous to that of a grid with respect to the cathode in the usual triode.

Figure 25:
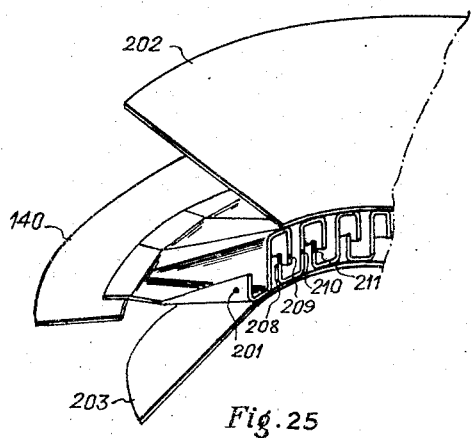
Fig. 25 is a partial perspective view of a modified form of corrugated diaphragm made up of a plurality of elements, together with the two conical diaphragms which are employed therewith.

Fig. 25 represents a view in perspective of a modified form of anode block, usable in tubes of the type shown in Fig. 19. In Fig. 25 there are shown segments 201 soldered at one end to a plane diaphragm 140 and at their other ends to two conical members 202 and 203. Elements 201 correspond to the diaphragm 155 of Fig. 21, and elements 202 and 203 correspond to the diaphragms 141 and 142 of Fig. 21.

Figure 26:
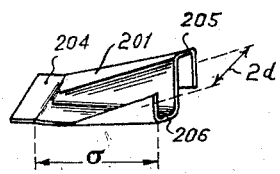
Fig. 26 is a perspective view of a single element or segment of the corrugated diaphragm of Fig. 25.

A single segment 201 is shown in perspective in Fig. 26. The segments 201 are arranged radially and interlock with each other much like the tiles of a roof, but without touching. The portions of the segments illustrated at 204, 205 and 206 are respectively soldered to the diaphragm 140 and to the conical members 202 and 203. The members 202 and 203 maintain appropriate separation of the ends of the segments circumferentially of the tube axis.

Figure 27:
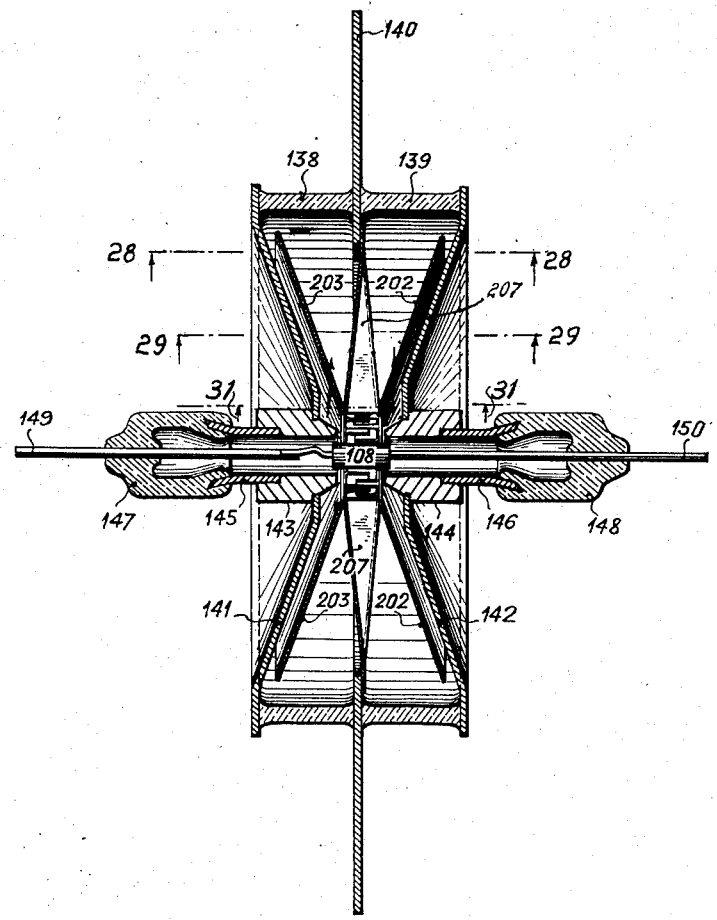
Fig. 27 is an axial section through the anode block of a further modified form of magnetron according to the invention including the corrugated partition of Fig. 25.

Fig. 27 is a figure similar to Fig. 21 but showing the modified construction of Figs. 25 and 26. In the embodiment of Fig. 27 moreover the corrugated diaphragm generally indicated at 207 is substantially different from that indicated at 155 in Fig. 21.

Figs. 28–32 presently to be discussed describe the conformation of the electric waves within the structure of Figs. 25–27. Inasmuch as the field configurations are cyclically repeated about the axis of the magnetron, only one or two cycles are indicated. The lines of the electric field are shown by means of lines whose density is indicative of the intensity of the field.

In order to understand the general case it is appropriate to consider first under what condition the totality of energy entering the tube is absorbed between the points 208—211 (Fig. 25) in the form of a balanced three-phase current, the oscillations of the successive points being dephased by 120°.

Figure 28:
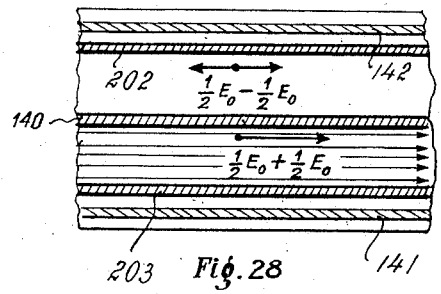
Fig. 28 is a fragmentary developed sectional view of the anode shown in Fig. 27, taken on a cylindrical section coaxial of the tube and identified by the line 28—28 of Fig. 27.

Fig. 28 represents a plot of the electric field on the cylinder 28—28 of Fig. 27. Let W be the power entering between the conducting diaphragms 140 and 203, which are separated by a distance greater than λ/2, and let $E_0$ be the maximum amplitude of the electric field, which has everywhere the same direction, i. e. a tangential one. Between the diaphragms 140 and 202 the electric field is zero by hypothesis.

The arguments given hereinabove have been developed on the basis of a superposition of two states of excitation, one symmetric and the other antisymmetric. The same procedure will be followed here. To this end let the field $E_0$ between partitions 140 and 203 be considered to be due to the superposition of two fields both of amplitude $1/2\ E_0$. Let the zero field between the partitions 140 and 202 be considered to be due to the opposition of two fields of amplitude $1/2\ E_0$ and $-1/2\ E_0$.

Figures 29, 30:
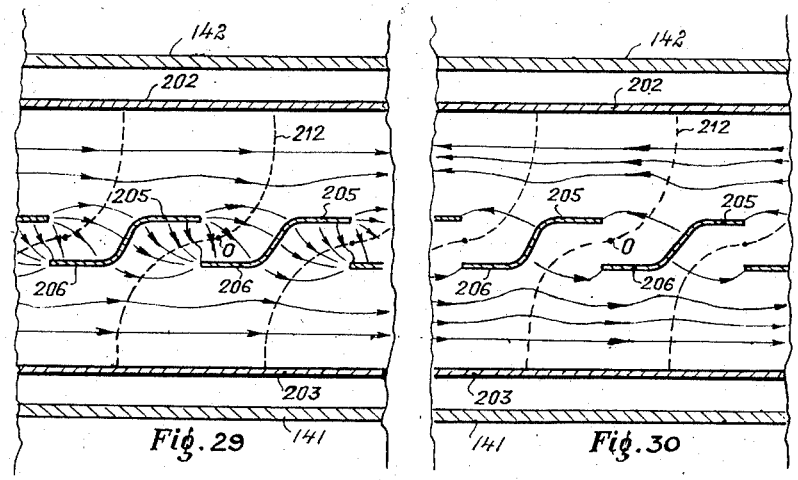
Fig. 29 is a sectional view similar to that of Fig. 28 but at a different scale and taken on a cylindrical section identified at 29—29 in Fig. 27.
Fig. 30 is a sectional view similar to that of Fig. 29 but showing an antisymmetric excitation of the tube.

Figs. 29 and 30 are plots of the fields (on the section surface 29—29 of Fig. 27) which are generated respectively by waves of amplitude $1/2\ E_0$, symmetrical with respect to partition 140 (Fig. 28) and by waves of amplitude $1/2\ E_0$ and $-1/2\ E_0$ which are antisymmetric. The dashed lines 212 pass through a plane of symmetry 0 and are plotted along trajectories orthogonal to the field lines. They will be called the "central laminae of the field."

In Fig. 31, which represents a partial section of the anode along the cylinder of generatrix 31—31, the central lamina 213 is indicated in dotted lines. Let $m$ be the length of this lamina, and let $x$ be the curvilinear abscissa of a point M on this lamina (the origin of abscissae being at the center of symmetry 0). If $2d$ is the width of a segment 201 (Fig. 26), the distance separating the two metallic surfaces belonging to adjacent segments on opposite sides of the central lamina (Fig. 31) is equal to $d$ since the segments are interlocked. $d$ is assumed constant and small by comparison with $m$. The waves are then propagated within this structure (radially of the tube axis) approximately as within a rectangular guide of height $d$ and width $m$. Consequently if $m$ lies between $\lambda$ and $3/2$ $\lambda$ the electric field along the normal to the central lamina 213 may have an amplitude proportional either to $$\cos \pi \frac{x}{m}$$

or to $$\sin 2\pi \frac{x}{m}$$

Therefore within the rectangular guide which is obtained by straightening out the central lamina it is only the waves $TE_{01}$ and $TE_{02}$ which can be propagated. The field proportional to $$\cos \pi \frac{x}{m}$$

is obtained from the symmetrical oscillation since in this case, as appears from Fig. 29 the electric field is everywhere directed in the same sense as regards the normal to the central lamina. The field proportional to $$\sin 2\pi \frac{x}{m}$$

is obtained from the antisymmetric oscillation since, as appears from Fig. 30, in this case the field is symmetric with respect to 0. The exact amplitudes of the field are obtained if regard is had for the power $W/2n$ transmitted and for the characteristic impedance presented by the guide to each type of wave. Actually the power $W$ entering the tube is divided in two, one half for each type of vibration, and further divided among the $n$ guides which are separated by the $n$ segments of the type shown in Fig. 26.

In view of the foregoing observations the amplitude of the electric fields for the symmetric and antisymmetric vibrations respectively, in MKS Giorgi units are $$\sqrt{\frac{60\pi W}{nd\sqrt{1-\frac{\lambda^2}{4m^2}}}} \cos \pi \frac{x}{m}$$

and $$\sqrt{\frac{30\pi W}{nd\sqrt{1-\frac{\lambda^2}{m^2}}}} \sin 2\pi \frac{z}{m}$$

There remains the problem of calculating the dephasing between these two waves. It may be assumed as an initial approximation that the phase velocity of the waves is determined only by the length of the central lamina. If the profile of segments 201 and the inclination of the diaphragms 202 and 203 are such that the length of the central lamina is constant and equal to $m$ and if $\sigma$ is the length of the slots between the segments (i. e. in terms of Fig. 26 if the length of the segment less the length of the portion 204 which is soldered to the diaphragm 140 is equal to $\delta$), the relative phase difference between the two waves is $$\varphi = \frac{2\pi\sigma}{\lambda}\left[\sqrt{1-\frac{\lambda^2}{4m^2}} - \sqrt{1-\frac{\lambda^2}{m^2}}\right]$$

These results are combined in the expression for the electric field along the normal to the central lamina of the section 31—31 which is adjacent to the electron beam.

$$E(x) = \sqrt{\frac{69\pi W}{nd}} \left[ \frac{\cos \pi \frac{x}{m}}{\left[1-\frac{\lambda^2}{4m^2}\right]^{1/4}} + \frac{\sin 2\pi \frac{x}{m} e^{-j\varphi}}{2\left[1-\frac{\lambda^2}{m^2}\right]^{1/4}} \right]$$

The interaction of the waves and of the electron beam takes place in the vicinity of the median line 214 of the section, i. e. at the location of points 208—211 (Fig. 31). In consequence of the periodicity of the system, 208 and 211 oscillate in phase and similarly 210 and 210', etc.

At 0 $x$ is zero, and the electric field between 208 and 209 is $E(0)$.

Between points 209 and 210 or 208 and 210', the values of $x$ are respectively $-m/3$ and $m/3$ and the normals to the central lamina are reversed with respect to the normal at 0. The condition that the electric fields between 210 and 209, 209 and 208 and between 208 and 210' be balanced three-phase in nature is expressed in the equations $$E_{(209-210)} = -E(-m/3) = E(0)e^{\pm j2\pi/3}$$

$$E_{(208-210')} = -E(m/3) = E(0)e^{\mp j2\pi/3}$$

In view of the value $E(x)$ these equations give the following values for $m$ and $\varphi$ $$m = \frac{\sqrt{5}}{2}\lambda = 1.12\lambda$$

$$\varphi = \pm \frac{\pi}{2}$$

In view of the value of $m/\lambda$ the expression for $\varphi$ gives $$\sigma = \frac{\sqrt{5}}{4}\lambda = 0.56\lambda$$

By inserting the value of $m/\lambda$ in the expression for $E(0)$ one obtains $$E(0) = \sqrt{30\sqrt{5}\pi\frac{W}{nd}}$$

The modulus of the field between 209 and 210 or between 208 and 210' has the same value. In order that the totality of energy be absorbed between these three points, it is necessary to insert three load resistances each capable of absorbing a power $W/3n$.

The common value of these resistances is $$Z_0 = \frac{\frac{1}{2}d^2E^2(0)}{W/3n} = 45\sqrt{5}\pi d = 316d$$

The impedance $Z_0$ plays the same part as the impedance $X\sqrt{3}$ in the circuit of Fig. 8. If between terminals 210, 209, 209 and 210' there are inserted equal impedances $Z$ but different from $Z_0$ the power $W_s$ reflected towards the output of the tube is given as a function of the entering power space by the expression $$W_s = W_e\left[\frac{Z-Z_0}{Z+Z_0}\right]^2$$

and if $Z$ represents the negative resistance of the electron beam, the last expression gives the gain of the amplifying magnetron.

The segments 201 of Fig. 26 shown interlocked to form the corrugated diaphragm of Fig. 25 may also be disposed side by side with an interval $2d$ separating the two metallic surfaces belonging to adjacent segments, as indicated in the modification of Fig. 32. The formula for $Z_0$ given above will then hold as applied to Fig. 32 upon replacement of $d$ by $2d$.

While the invention has been described hereinabove in terms of a number of preferred embodiments, various alterations and modifications thereof may be made within the scope of the invention, which is set forth in the appended claims.

I claim:

1. An electron discharge tube of the magnetron type for use in amplifying electromagnetic waves, adapted to be coupled between input and output circular wave guides and to accept radiation propagated through the input guide in the $TE_{01}$ circular mode, said tube comprising a cathode, means to concentrate an axial magnetic field about the cathode substantially parallel thereto, and metallic means defining a plurality of input and an equal plurality of output wave guides extending at least in part substantially radially of the cathode and having at least in the portion thereof adjacent the cathode a substantially rectangular cross section, said rectangular guides opening adjacent the cathode in a circular array around the cathode in which input and output guides are alternated, said rectangular guides opening at their radially outward ends into passages communicating with the input and output circular guides, said guide-defining means being electrically insulated from the cathode for the application of anode potential between said part and the cathode, said guide-defining means including for each pair of one input and one output rectangular guide three circumferentially spaced metallic resonant elements adapted to sustain a three-phase voltage at a frequency at or above that corresponding to the long wave length limit of said rectangular guides.

2. An electron discharge tube of the magnetron type for use in amplifying electromagnetic waves, adapted to be coupled between input and output circular wave guides and to accept radiation propagated through the input guide in the $TE_{01}$ circular mode, said tube comprising a cathode, means to concentrate an axial magnetic field about the cathode substantially parallel thereto, and metallic means defining a plurality of input and an equal plurality of output wave guides extending at least in part substantially radially of the cathode and having at least in the portion thereof adjacent the cathode a substantially rectangular cross section, said rectangular guides opening adjacent the cathode in a circular array around the cathode in which input and output guides are alternated, said rectangular guides opening at their radially outward ends into passages communicating with the input and output circular guides, said guide-defining means being electrically insulated from the cathode for the application of anode potential between said part and the cathode, said guide-defining means including half again as many resonant elements as rectangular guides, said elements being disposed in a circular array adjacent the inner ends of said rectangular guides and being adapted to support each a voltage at the frequency of the energy supplied to the input circular guide and displaced by 120° from the voltages on the circumferentially adjacent resonant elements.

3. An electron discharge tube of the magnetron type for use in amplifying electromagnetic waves in the millimeter range of wave length, said tube being adapted to be coupled between coaxial input and output circular wave guides and to accept energy propagated through the input guide in the $TE_{01}$ circular mode, said tube including a cathode coaxial of said guides, means to concentrate an axial magnetic field about the cathode substantially parallel thereto, and metallic means defining a plurality of input guides and an equal plurality of output guides, the guides of said pluralities extending at least in part substantially radially of the cathode and having at least adjacent the cathode a substantially rectangular cross section with a width extending axially of the cathode and through each of which rectangular guides the energy of the $TE_{01}$ circular input wave to the tube will flow as a partial wave in the $TE_{01}$ rectangular mode, said rectangular guides opening adjacent the cathode in a circular array around the cathode in which input guides alternate with output guides, said guide-defining means being electrically insulated from the cathode for the application of anode voltage between said part and the cathode, said guide-defining means including adjacent the radially inner ends of said rectangular guides for each pair of one input and one output guide three resonant elements circumferentially displaced from each other and susceptible of sustaining a three-phase voltage at the frequency of the partial waves propagated radially inward down said input rectangular guides.

4. An amplifying magnetron adapted to be coupled between circular wave guides and to amplify energy delivered thereto in the $TE_{01}$ circular mode, said magnetron including an axial cathode, means to conduct an externally generated magnetic field to a gap embracing the cathode, input and output filters on axially opposite sides of said cathode permitting passage of $TE_{01}$ circular waves, means defining a plurality of substantially rectangular input guides radially of the cathode, means defining an equal plurality of substantially rectangular output guides radially of the cathode, said rectangular guides opening adjacent the cathode in a circular array about the cathode in which input and output guides alternate, said guide-defining means being insulated from the cathode for the application of anode voltage between said part and the cathode, and equal pluralities of double- and single-edged metallic segments positioned in a circular array radially inside the inner ends of said rectangular guides, said segments being equal in total number to the total number of rectangular guides, said segments being positioned circumferentially opposite the walls separating adjacent input and output guides, the edges of said segments being susceptible of supporting a plurality of alternating current voltages of the frequency of the input wave applied to the tube and of 120° phase difference between each edge and the circumferentially adjacent edge, whereby a progressive wave may be generated rotating about the cathode in a time which is a multiple of the period of the input wave multiplied by the number of input rectangular guides.

5. An amplifying magnetron adapted to be coupled between input and output circular wave guides, said magnetron comprising a substantially cylindrical metallic envelope, a cathode coaxial of said envelope, means to concentrate an externally generated magnetic field in a gap embracing said cathode, two substantially conical metallic members supported coaxially within said envelope with their convex surfaces remote from each other, said members defining with the envelope annular spaces of inner diameter increasing generally with motion axially of the envelope from the apices to the bases of said members, two conical metallic diaphragms supported coaxially of the envelope between said members with their convex surfaces facing each other, and an anode disposed about said cathode, said anode comprising a plane diaphragm engaging the inner surface of said envelope and a corrugated diaphragm supported from said plane diaphragm between said conical diaphragms, said corrugated diaphragm conforming in part substantially to two cones having their concave surfaces facing each other and in part to a plurality of planes containing the tube axis, said conical and corrugated diaphragms defining a plurality of input guides connecting with the input annular space and an equal plurality of output guides connecting with the output annular space, said input and output guides extending generally radially of the cathode and having adjacent the cathode a substantially rectangular cross section.

6. An electron discharge tube of the magnetron type for use in amplifying electromagnetic waves, adapted to be coupled between coaxial circular wave guides and to accept radiation propagated through the input guide in the $TE_{01}$ circular mode, said tube including a substantially cylindrical hollow metallic envelope coaxial of said guides, two metallic members of substantially conical shape supported coaxially within the envelope with their convex surfaces remote from each other, said members defining within the envelope annular spaces of internal diameter increasing upon progress axially of the envelope from the apices to the bases of said members, a cathode supported between said members coaxially of the envelope, means to concentrate a magnetic field about the cathode substantially parallel thereto, and means defining a double plurality of wave guides extending radially from the vicinity of the cathode to the narrow ends of said annular spaces, said guides having a substantially rectangular cross section adjacent the cathode, said last-named means comprising two apertured metallic diaphragms positioned coaxially of the cathode between said members and a corrugated metallic diaphragm supported therebetween, said corrugated diaphragm constituting the anode of the tube and conforming in part to two cones having their concave surfaces facing each other and in part to a plurality of planes containing the tube axis.

7. An electron discharge tube of the magnetron type for use in amplifying electromagnetic waves, adapted to be coupled between circular input and output wave guides, said tube comprising a substantially cylindrical metallic envelope, two substantially conical metallic members supported coaxially of the envelope with their bases facing each other, said bases having a rounded profile in axial sections of said members, said members defining with said envelope input and output annular spaces of inner diameter increasing progressively with motion axially of the envelope from the apices towards the bases of said members, a cathode insulatedly supported from said members between their bases coaxially of said envelope, means within said members for concentrating a magnetic field at a gap embracing said cathode, three apertured metallic diaphragms supported between said members coaxially of said envelope, the middle of said diaphragms being insulatedly supported between the other two of said diaphragms to constitute an anode for the tube and having a surface conforming in part to two cones with their concave surfaces facing each other and in part to a plurality of planes containing the envelope axis, said diaphragms defining a double plurality of wave guides extending radially of the cathode, opening adjacent the cathode in a circular array of which alternate members connect with the input and output annular spaces, each circumferentially adjacent pair of said radially extending guides presenting adjacent the cathode three metallic elements adapted to sustain between them a three-phase voltage of the frequency of the energy supplied to the input circular guide.

8. An amplifying magnetron according to claim 4 in which said double- and single-edged segments are respectively of U- and Δ-shape.

9. An electron discharge tube according to claim 1 in which said metallic means defining a plurality of input and an equal plurality of output wave guides comprise two conical metallic diaphragms supported coaxially of the envelope between said members with their convex surfaces facing each other, a plane annular metallic diaphragm supported between the conical diaphragms, and a plurality of laminar metallic members having at one end fastened to said annular diaphragm a plane section and at their other end adjacent the cathode an S-shaped section including a first straight side extending between the conical diaphragms, second and third sides in contact each with one of the conical diaphragms, and fourth and fifth sides parallel to said first side, said fourth and fifth sides having a length less than the least separation between the conical diaphragms and greater than one-half said separation.

10. An electron discharge tube of the magnetron type according to claim 9 in which said laminar metallic members have their fourth and fifth sides interlocked respectively with the fifth and fourth sides of adjacent members of said plurality of laminar members.

11. An amplifying magnetron according to claim 4 including a resonant grid of axially extending conductors disposed in a circular array at the radially inner ends of said segments in electrical insulation from said cathode, said last-named array including an equal number of conductors between each pair of adjacent segment edges.

References Cited in the file of this patent

UNITED STATES PATENTS

| | | |
|---|---|---|
| 2,129,713 | Southworth | Sept. 13, 1938 |
| 2,418,117 | Hale et al. | Apr. 1, 1947 |
| 2,509,419 | Brown | May 30, 1950 |
| 2,555,349 | Litton | June 5, 1951 |
| 2,562,738 | Ramo | July 31, 1951 |
| 2,715,697 | Webber | Aug. 16, 1955 |